US012546818B2

(12) United States Patent
Ahn et al.

(10) Patent No.: US 12,546,818 B2
(45) Date of Patent: Feb. 10, 2026

(54) GUIDE PLATE AND TEST DEVICE INCLUDING SAME

(71) Applicant: POINT ENGINEERING CO., LTD., Chungcheongnam-do (KR)

(72) Inventors: Bum Mo Ahn, Gyeonggi-do (KR); Seung Ho Park, Gyeonggi-do (KR); Sung Hyun Byun, Gyeonggi-do (KR)

(73) Assignee: POINT ENGINEERING CO., LTD., Chungcheongnam-do (KR)

( * ) Notice: Subject to any disclaimer, the term of this patent is extended or adjusted under 35 U.S.C. 154(b) by 156 days.

(21) Appl. No.: 18/485,262

(22) Filed: Oct. 11, 2023

(65) Prior Publication Data
US 2024/0118337 A1 Apr. 11, 2024

(30) Foreign Application Priority Data
Oct. 11, 2022 (KR) ........................ 10-2022-0129787

(51) Int. Cl.
*G01R 31/28* (2006.01)
*G01R 1/073* (2006.01)

(52) U.S. Cl.
CPC ..... *G01R 31/2887* (2013.01); *G01R 1/07371* (2013.01)

(58) Field of Classification Search
None
See application file for complete search history.

(56) References Cited

U.S. PATENT DOCUMENTS

| 2004/0127027 A1* | 7/2004 | Lee | H01L 21/76862 438/683 |
| 2005/0150683 A1* | 7/2005 | Farnworth | H05K 3/426 257/E23.008 |
| 2013/0009322 A1* | 1/2013 | Conn | H01L 23/49827 257/E21.59 |
| 2014/0266274 A1* | 9/2014 | Shiraishi | G01R 1/07357 324/750.25 |
| 2014/0266275 A1* | 9/2014 | Kimura | G01R 1/07357 324/750.25 |
| 2015/0168450 A1* | 6/2015 | Wooden | G01R 1/0466 324/756.02 |

FOREIGN PATENT DOCUMENTS

| CN | 102666940 A | * | 9/2012 | ......... C23C 18/1608 |
| CN | 104508499 A | * | 4/2015 | ............ C25D 1/003 |
| EP | 1553616 A1 | * | 7/2005 | ............ B82Y 10/00 |
| JP | 2018077090 | | 5/2018 | |
| KR | 20120033997 A | * | 4/2012 | |
| KR | 102193964 | | 12/2020 | |

* cited by examiner

*Primary Examiner* — Rodney E Fuller
(74) *Attorney, Agent, or Firm* — JCIPRNET

(57) ABSTRACT

Proposed are a guide plate and a test device including the guide plate capable of being insulated from electrically conductive contact pins and capable of blocking signal interference between the electrically conductive contact pins.

5 Claims, 10 Drawing Sheets

GUIDE PLATE AND TEST DEVICE INCLUDING SAME

CROSS REFERENCE TO RELATED APPLICATION

The present application claims priority to Korean Patent Application No. 10-2022-0129787, filed Oct. 11, 2022, the entire contents of which are incorporated herein for all purposes by this reference.

BACKGROUND OF THE INVENTION

Field of the Invention

The present disclosure relates to a guide plate and a test device including the guide plate.

Description of the Related Art

A semiconductor package test is performed by a test device including a guide plate in which an electrically conductive contact pin manufactured by a Micro-Electro-Mechanical System (MEMS) process is inserted into a penetration hole.

Specifically, a plurality of electrically conductive contact pins is mounted in the guide plate through a plurality of penetration holes, and a test is performed by contacting the electrically conductive contact pins with a connection terminal of an object to be tested.

A conventional guide plate is provided with an insulation material including ceramic, resin, and silicone so as to prevent an electrical connection with the electrically conductive contact pin.

However, since the guide plate having the insulation material does not block a signal interference between the electrically conductive contact pins in testing high frequency characteristics of a semiconductor package, a signal interference problem or a noise problem between the contact pins may occur.

In addition, since the guide plate has relatively low rigidity, a warpage problem may occur. As a result, a problem in which a height deviation of the contact pins occurs may occur.

DOCUMENT OF RELATED ART (Patent Document 1) Korean Patent No. 10-2193964
(Patent Document 2) Japanese Patent Application Publication JP2018-77090A

SUMMARY OF THE INVENTION

Accordingly, the present disclosure has been made keeping in mind the above problems occurring in the related art, and an objective of the present disclosure is to provide a guide plate and a test device including the guide plate capable of preventing a signal interference or a noise problem between electrically conductive contact pins inserted into penetration holes and capable of being insulated from the electrically conductive contact pins.

According to an aspect of the present disclosure, there is provided a guide plate including: a metal body including a penetration hole passing through the metal body in up and down directions; and a surface insulation layer formed on a surface of the metal body.

In addition, the guide plate may further include a ground metal layer connected to the metal body by passing through the surface insulation layer.

In addition, the surface insulation layer may include an anodic oxide insulation film famed by anodizing the metal body.

In addition, the surface insulation layer may include a deposition insulation film formed by atomic layer deposition.

In addition, the surface insulation layer may include: an anodic oxide insulation film formed by anodizing the metal body; and a deposition insulation film formed on a surface of the anodic oxide insulation film by atomic layer deposition.

According to another aspect of the present disclosure, there is provided a test device including: a guide plate including a metal body that includes a penetration hole, the guide plate including a surface insulation layer formed on a surface of the metal body; and an electrically conductive contact pin inserted into the penetration hole.

In the present disclosure, since the metal body is included, the signal interference or the noise problem between the electrically conductive contact pins is capable of being prevented in testing high frequency characteristics, an electrical short is capable of being prevented by maintaining a state in which the guide plate is insulated from the electrically conductive contact pins by providing the surface insulation layer on the surface of the metal body, and the guide plate and the test device including the guide plate having high abrasion resistance and high durability against sliding friction with the contact pins are provided.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Contents of the description below merely exemplify the principle of the present disclosure. Therefore, those of ordinary skill in the art may implement the theory of the present disclosure and invent various apparatuses which are included within the concept and the scope of the disclosure even though it is not clearly explained or illustrated in the description. Furthermore, in principle, all the conditional terms and embodiments listed in this description are clearly intended for the purpose of understanding the concept of the present disclosure, and one should understand that this disclosure is not limited to the exemplary embodiments and the conditions.

The above described objectives, features, and advantages will be more apparent through the following detailed description related to the accompanying drawings, and thus those of ordinary skill in the art may easily implement the technical spirit of the present disclosure.

The embodiments of the present disclosure will be described with reference to cross-sectional views and/or perspective views which schematically illustrate ideal embodiments of the present disclosure. For explicit and convenient description of the technical content, thicknesses and widths of films and regions in the figures may be exaggerated. Therefore, variations from the shapes of the illustrations as a result, for example, of manufacturing techniques and/or tolerances, are to be expected. Thus, the embodiments should not be construed as limited to the particular shapes of regions illustrated herein but are to include deviations in shapes that result, for example, from manufacturing. The tams used in the present specification are only used to describe specific embodiments, and are not intended to limit the present disclosure. Singular expressions include plural expressions unless the context clearly indicates otherwise. It will be further understood that the tams "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, an exemplary embodiment of the present disclosure will be described in detail with reference to the accompanying drawings.

Figure 1:
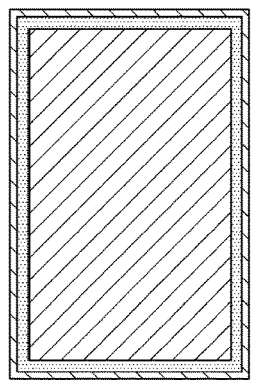
FIG. 1 is a view enlarging and illustrating a portion of a guide plate according to an exemplary embodiment of the present disclosure.
Figure 1:
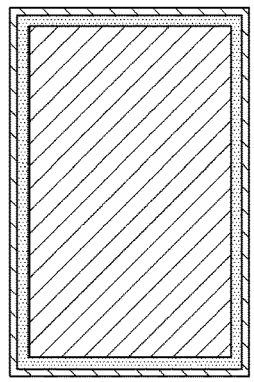
Figure 1:
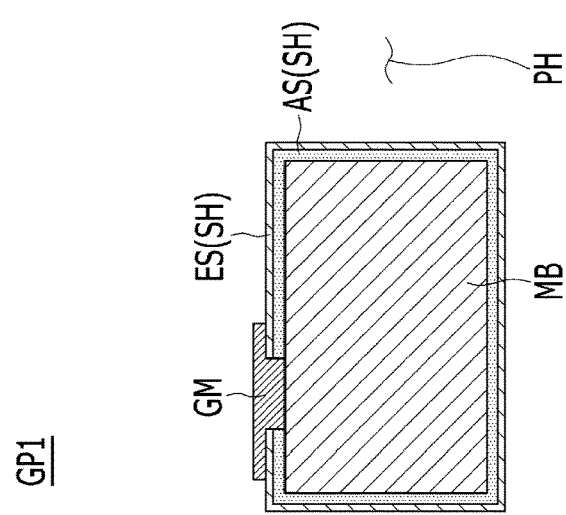

FIG. 1 is a view enlarging and schematically illustrating a portion of a guide plate according to an exemplary first embodiment of the present disclosure.

The guide plate of the first embodiment includes a metal body MB including a penetration hole PH that penetrates the metal body MB in up and down directions, and includes a surface insulation layer SH formed on a surface of the metal body MB.

The metal body MB may be formed of aluminum (Al) or an aluminum alloy material. In addition, the metal body MB is not limited to aluminum (Al) or the aluminum alloy material, and the metal body MB includes Ta, Nb, Ti, Zr, Hf, W, Sb, or alloys thereof.

The metal body MB is provided with the penetration hole PH that penetrates the metal body MB in the up and down directions. The penetration hole PH includes a plurality of penetration holes PH spaced apart from each other by a predetermined separation distance. The penetration hole PH is formed such that the penetration hole PH has a diameter larger than a diameter of a pore of a porous layer of an anodic oxide film that will be described later.

Since the guide plate of the first embodiment has the metal body MB, a signal interference between electrically conductive contact pins EP may be prevented in a state in which the electrically conductive contact pins EP are mounted in the guide plate. A metal material provides a function of shielding a surrounding signal. Accordingly, by a structure in which the guide plate of the first embodiment includes the metal body MB, the guide plate of the first embodiment may prevent the signal interference or noise between the contact pins EP in the state in which the contact pins EP are mounted in the guide plate.

The surface insulation layer SH is formed by surrounding the surface of the metal body MB. The surface insulation layer SH is formed entirely on the surface of the metal body MB by surrounding the surface of the metal body MB.

The surface insulation layer SH includes an anodic oxide insulation film AS famed by anodizing the metal body MB.

The anodic oxide insulation film AS is a film which uses the metal body MB as a base metal and which is formed by anodizing the base metal, and is formed of an anodic oxide film material. The anodic oxide insulation film AS includes a barrier layer that does not include a pore, and includes a porous layer that includes a pore.

The barrier layer is positioned at an upper portion of the metal body MB that is a base material, and the porous layer is positioned at an upper portion of the barrier layer. Preferably, the barrier layer is formed such that the barrier layer has a thickness of several hundreds nm. More preferably, the barrier layer is formed such that the barrier layer has a thickness of 1 nm or more and 100 nm or less. The porous layer is formed such that the porous layer has a thickness between several tens μm and several hundreds μm. The pores of the porous layer have a diameter of several nm or more and several hundreds nm or less.

The anodic oxide film may be formed such that the anodic oxide film has a structure including the barrier layer that does not include a pore, or has a structure including the porous layer in which the pores penetrate the porous layer in the up and down directions. In other words, the anodic oxide film may be provided such that the anodic oxide film includes only the barrier layer or includes the porous layer.

The anodic oxide film has a coefficient of thermal expansion of 2 ppm/° C. to 3 ppm/° C., so that there is less thermal defamation due to temperature even when the anodic oxide film is exposed to a high temperature environment. In addition, the anodic oxide film has insulation property.

The anodic oxide insulation film AS is formed by directly contacting the surface of the metal body MB and surrounding the surface of the metal body MB. Accordingly, an anodic oxide insulation film AS is formed on upper and lower surfaces of the metal body MB and on the surface of the metal body MB including an inner wall of the penetration hole PH.

The guide plate in the first embodiment has insulation property by being provided with the anodic oxide insulation film AS on the surface of the metal body MB. Accordingly, in the guide plate of the first embodiment, when the electrically conductive contact pin EP is mounted in the penetration hole PH, the contact pin EP is not in direct contact with the metal body MB, so that an electrical short problem may be prevented.

As such, in the guide plate of the first embodiment, when the electrically conductive contact pins EP are mounted through the metal body MB, the guide plate of the first embodiment has a function that blocks a signal interference or a noise problem between the contact pins EP, and has insulation property by the surface insulation layer SH provided on the surface of the metal body MB. Therefore, the guide plate of the present disclosure may prevent a signal interference or a noise problem between the contact pins EP when a test (specifically, a high frequency characteristic test) is performed, and may allow a more accurate measurement to be performed without an electrical short problem between the guide plate and the contact pins EP.

The anodic oxide insulation film AS may include the barrier layer. In this case, the anodic oxide insulation film AS is provided only with the barrier layer which does not include the porous layer positioned at the upper portion of the barrier layer and which does not include pores.

Since the guide plate of the first embodiment has the anodic oxide insulation film AS that is provided with the barrier layer in which the pores do not exist, an advantageous effect in terms of durability may be realized.

Specifically, the barrier layer is a structure that does not include the pores, and is formed such that the barrier layer has a smooth surface along the surface of the metal body MB, so that the barrier layer has a relatively small surface roughness. In the guide plate of the first embodiment, since the barrier layer is provided as the anodic oxide insulation film AS, problems with particles and damage to the inner wall of the penetration hole PH caused by friction between the contact pin EP and the inner wall of the penetration hole PH when the electrically conductive contact pin EP is slidably moved inside the penetration hole PH may be relatively minimized.

The anodic oxide insulation film AS may not only be provided with the barrier layer but also be provided with the pores. In this case, the surface roughness is relatively increased due to the pores.

In this case, when the electrically conductive contact pin EP is slidably moved inside the penetration hole PH, there is a relatively high possibility of particles being generated due to the pores as the inner wall of the penetration hole PH rubs with the contact pin EP, and there is a high possibility that the inner wall of the penetration hole PH will be easily damaged.

However, preferably, the guide plate of the first embodiment has the anodic oxide insulation film AS on the surface of the metal body MB, the anodic oxide insulation film AS being provided with the barrier layer that does not include the pores. Therefore, in the guide plate of the first embodiment, when the electrically conductive contact pin EP is slidably moved inside the penetration hole PH, generation of particles and the damage to the inner wall of the penetration hole PH due to friction between the contact pin EP and the inner wall of the penetration hole PH are minimized, so that the guide plate of the first embodiment may have relatively high durability.

The surface insulation layer SH includes a deposition insulation film ES foiled by atomic layer deposition.

Preferably, the deposition insulation film ES is formed on a surface of the anodic oxide insulation film AS that is famed on the surface of the metal body MB. Accordingly, the guide plate of the first embodiment has a structure in which the metal body MB, the anodic oxide insulation film AS, and the deposition insulation film ES are sequentially stacked in an outward direction.

The deposition insulation film ES is provided on the surface of the anodic oxide insulation film AS and is exposed to the outside, and is exposed at the inner wall of the penetration hole PH.

The deposition insulation film ES may be formed by alternately supplying a precursor gas, which is at least one of aluminum, silicon, hafnium, zirconium, yttrium, erbium, titanium, and tantalum, and a reactant gas capable of forming a film that constitutes the deposition insulation film ES. More specifically, the deposition insulation film ES is formed by repeatedly performing a cycle in which the precursor gas is adsorbed on the surface of the anodic oxide insulation film AS, and the reactant gas is supplied so as to generate a monoatomic layer through a chemical substitution of the precursor gas with the reactant gas.

When the cycle is performed one time, one thin monoatomic layer is formed. As the deposition insulation film ES is formed by repeatedly performing the cycle, the deposition insulation film ES has a plurality of monoatomic layers. Preferably, the deposition insulation film ES is famed such that the deposition insulation film ES has a thickness of 1 nm or more and 500 nm or less.

According to constituent components of the precursor gas and the reactant gas, the deposition insulation film ES may include at least one of an aluminum oxide layer, an yttrium oxide layer, a hafnium oxide layer, a silicon oxide layer, an erbium oxide layer, a zirconium oxide layer, a fluorinated layer, a transition metal layer, a titanium nitride layer, a tantalum nitride layer, and a zirconium nitride layer.

More specifically, when the deposition insulation film ES is formed of the aluminum oxide layer, the precursor gas may include at least one of aluminum alkoxide (Al(T-OC$_4$H$_9$)$_3$), aluminum chloride (AlCl$_3$), trimethyl aluminum (TMA: Al(CH$_3$)$_3$), diethylaluminum ethoxide, tris(ethylmethylamido)aluminum, aluminum sec-butoxide, aluminum tribromide, aluminum trichloride, triethylaluminum, tri-isobutylaluminum, trimethylaluminum, and tris(diethylamido)aluminum.

At this time, when at least one of aluminum alkoxide (Al(T-OC$_4$H$_9$)$_3$), diethylaluminum ethoxide, tris(ethylmethylamido)aluminum, aluminum sec-butoxide, aluminum tribromide, aluminum trichloride, triethylaluminum, tri-isobutylaluminum, trimethylaluminum, and tris(diethylamido)aluminum is used as the precursor gas, H$_2$O may be used as the reactant gas.

When aluminum chloride (AlCl$_3$) is used as the precursor gas, O$_3$ may be used as the reactant gas.

When trimethyl aluminum (TMA: Al(CH$_3$)$_3$) is used as the precursor gas, O$_3$ or H$_2$O may be used as the reactant gas.

when the deposition insulation film ES is formed of the yttrium oxide layer, the precursor gas may include at least one of yttrium chloride (YCl$_3$), Y(C$_5$H$_5$)$_3$, tris(N,N-bis(trimethylsilyl)amide)yttrium(III), yttrium(III)butoxide, tris(cyclopentadienyl)yttrium(III), tris(butylcyclopentadienyl)yttrium(III), tris(2,2,6,6-tetramethyl-3,5-heptanedionato)yttrium(III), tris(cyclopentadienyl)yttrium (Cp3Y), tris(methylcyclopentadienyl)yttrium ((CpMe)3Y), tris(butylcyclopentadienyl)yttrium, and tris(ethylcyclopentadienyl)yttrium.

In this case, when at least one of yttrium chloride (YCl$_3$) and Y(C$_5$H$_5$)$_3$ is used as the precursor gas, O$_3$ may be used as the reactant gas.

When at least one of tris(N,N-bis(trimethylsilyl)amide)yttrium(III), yttrium(III)butoxide, tris(cyclopentadienyl)yttrium(III), tris(butylcyclopentadienyl)yttrium(III), tris(2,2,6,6-tetramethyl-3,5-heptanedionato)yttrium(III), tris(cyclopentadienyl)yttrium (Cp3Y), tris(methylcyclopentadienyl)yttrium ((CpMe)3Y), tris(butylcyclopentadienyl)yttrium, and tris(ethylcyclopentadienyl)yttrium is used as the precursor gas, at least one of H$_2$O, O$_2$, and O$_3$ may be used as the reactant gas.

When the deposition insulation film ES is formed of the hafnium oxide layer, the precursor gas may include at least one of hafnium chloride (HfCl$_4$), Hf(N(CH$_3$)(C$_2$H$_5$))$_4$, Hf(N(C$_2$H$_5$)$_2$)$_4$, tetrakis(ethylmethylamido)hafnium, and pentakis(dimethylamido)tantalum.

In this case, when at least one of hafnium chloride (HfCl$_4$), Hf(N(CH$_3$)(C$_2$H$_5$))$_4$, and Hf(N(C$_2$H$_5$)$_2$)$_4$ is used as the precursor gas, O$_3$ may be used as the reactant gas.

When at least one of tetrakis(ethylmethylamido)hafnium and pentakis(dimethylamido)tantalum is used as the precursor gas, at least one of $H_2O$, $O_2$, and $O_3$ may be used as the reactant gas.

When the deposition insulation film ES is formed of the silicon oxide layer, the precursor gas may include $Si(OC_2H_5)_4$. In this case, $O_3$ may be used as the reactant gas.

When the deposition insulation film ES is foiled of the erbium oxide layer, the precursor gas may include at least one of tris-methylcyclopentadienyl erbium(III) (Er(MeCp)$_3$), erbium boranamide (Er(BA)$_3$) Er(TMHD)$_3$, erbium(III)tris(2,2,6,6-tetramethyl-3,5-heptanedionate), tris(butylcyclopentadienyl)erbium(III), tris(2,2,6,6-tetramethyl-3,5-heptanedionato)erbium (Er(thd)$_3$), Er(PrCp)$_3$, Er(CpMe)$_2$, Er(BuCp)$_3$, and Er(thd)$_3$.

In this case, when at least one of tris-methylcyclopentadienyl erbium(III) (Er(MeCp)$_3$), erbium boranamide (Er(BA)$_3$), Er(TMHD)$_3$, erbium(III)tris(2,2,6,6-tetramethyl-3,5-heptanedionate), and tris(butylcyclopentadienyl)erbium(III) is used as the precursor gas, at least one of $H_2O$, $O_2$, and $O_3$ may be used as the reactant gas.

When at least one of tris(2,2,6,6-tetramethyl-3,5-heptanedionato)erbium (Er(thd)$_3$), Er(PrCp)$_3$, Er(CpMe)$_2$, and Er(BuCp)$_3$ is used as the precursor gas, $O_3$ may be used as the reactant gas.

When Er(thd)$_3$ is used as the precursor gas, an O radical may be used as the reactant gas.

When the deposition insulation film ES is formed of the zirconium oxide layer, the precursor gas may include at least one of zirconium tetrachloride (ZrCl$_4$), Zr (t-OC$_4$H$_9$)$_4$, zirconium(IV) bromide, tetrakis(diethylamido)zirconium(IV), tetrakis(dimethylamido)zirconium(IV), tetrakis(ethylmethylamido)zirconium(IV), tetrakis(N,N'-dimethyl-formamidinate)zirconium, tetrakis(ethylmethylamido)hafnium, pentakis(dimethylamido)tantalum, tris(dimethylamino)(cyclopentadienyl)zirconium, and tris(2,2,6,6-tetramethyl-heptane-3,5-dionate)erbium.

When at least one of components described above is used as the precursor gas, at least one of $H_2O$, $O_2$, $O_3$, and an O radical may be used as the reactant gas.

When the deposition insulation film ES is formed of the fluorinated layer, the precursor gas may include tris(2,2,6,6-tetramethyl-3,5-heptanedionato)yttrium(III). In this case, at least one of $H_2O$, $O_2$, and $O_3$ may be used as the reactant gas.

When the deposition insulation film ES is formed of the transition metal layer, the precursor gas may include at least one of tantalum pentachloride (TaCl$_5$) and titanium tetrachloride (TiCl$_4$). In this case, an H radical may be used as the reactant gas.

Specifically, when tantalum pentachloride (TaCl$_5$) is used as the precursor gas and the H radical is used as the reactant gas, the transition metal layer may be formed of a tantalum layer.

On the other hand, when titanium tetrachloride (TiCl$_4$) is used as the precursor gas and the H radical is used as the reactant gas, the transition metal layer may be famed of a titanium layer.

When the deposition insulation film ES is formed of the titanium nitride layer, the precursor gas may include at least one of bis(diethylamido)bis(dimethylamido)titanium(IV), tetrakis(diethylamido)titanium(IV), tetrakis(dimethylamido)titanium(IV), tetrakis(ethylmethylamido)titanium(IV), titanium(IV) bromide, titanium(IV) chloride, and titanium(IV) tert-butoxide. In this case, at least one of $H_2O$, $O_2$, $O_3$, and an O radical may be used as the reactant gas.

When the deposition insulation film ES is formed of the tantalum nitride layer, the precursor gas may include at least one of pentakis(dimethylamido)tantalum(V), tantalum(V) chloride, tantalum(V) ethoxide, and tris(diethylamino)(tert-butylimido)tantalum(V). In this case, at least one of $H_2O$, $O_2$, $O_3$, and an O radical may be used as the reactant gas.

When the deposition insulation film ES is formed of the zirconium nitride layer, the precursor gas may include at least one of zirconium(IV) bromide, zirconium(IV) chloride, zirconium(IV) tert-butoxide, tetrakis(diethylamido)zirconium(IV), tetrakis(dimethylamido)zirconium(IV), and tetrakis(ethylmethylamido)zirconium(IV). In this case, at least one of $H_2O$, $O_2$, $O_3$, and an O radical may be used as the reactant gas.

As such, the deposition insulation film ES may be formed in different configurations according to configurations of the precursor gas and the reactant gas.

Since the guide plate of the first embodiment is provided with the deposition insulation film ES, the guide plate has more excellent abrasion resistance and durability. Preferably, in a state in which the anodic oxide insulation film AS is formed on the surface of the metal body MB, the deposition insulation film ES is famed on the surface of the anodic oxide insulation film AS. The deposition insulation film ES is formed along the surface of the anodic oxide insulation film AS.

When the anodic oxide insulation film AS is provided such that the anodic oxide insulation film AS includes the barrier layer and the porous layer, the deposition insulation film ES is formed along a porous surface of the porous layer.

On the other hand, when the anodic oxide insulation film AS is provided such that the anodic oxide insulation film AS only includes the barrier layer, the deposition insulation film ES is famed along the surface of the barrier layer.

Preferably, in the guide plate of the first embodiment, the anodic oxide insulation film AS provided with the barrier layer is formed on the surface of the metal body MB, and the deposition insulation film ES is formed on the surface of the anodic oxide insulation film AS along the surface of the barrier layer. Accordingly, the guide plate of the first embodiment is provided with the surface insulation layer (specifically, the deposition insulation film ES) which has a smooth surface and which is formed on the surface of the metal body MB.

As the deposition insulation film ES is formed smoothly along the surface of the barrier layer that does not have the pores, the inner wall of the penetration hole PH of the guide plate of the first embodiment has a smooth surface without pores. In other words, by the deposition insulation film ES, the roughness of the surface of the inner wall of the penetration hole PH is small.

Therefore, in the guide plate of the first embodiment, when the electrically conductive contact pin EP is slidably moved inside the penetration hole PH, generation of particles and the damage due to friction caused by friction of the inner wall of the penetration hole PH are minimized, so that the guide plate of the first embodiment may have high abrasion resistance and high durability.

The guide plate of the first embodiment is provided with the anodic oxide insulation film AS in direct contact with the surface of the metal body MB, and is provided with the deposition insulation film ES that surrounds the anodic oxide insulation film AS. Therefore, the surface insulation layer SH including two insulation films (anodic oxide insulation film AS and the deposition insulation film ES) formed on the surface of the metal body MB is provided.

Therefore, the guide plate of the first embodiment may prevent the signal interference problem and the noise problem in testing the high frequency characteristics, and may have excellent abrasion resistance and excellent durability against friction with the contact pin EP.

Meanwhile, the guide plate of the first embodiment may be provided with the surface insulation layer SH provided with the deposition insulation film ES, the surface insulation layer SH directly contacting the surface of the metal body MB such that the surface insulation layer surrounds the metal body MB. The deposition insulation film ES may have insulation property and may provide an insulation function to the guide plate of the first embodiment. In addition, the deposition insulation film ES may protect the metal body MB on the surface of the metal body MB, thereby being capable of minimizing a damage problem caused by friction with the electrically conductive contact pin EP.

The guide plate of the first embodiment includes a ground metal layer GM that is connected to the metal body MB through the surface insulation layer SH.

The ground metal layer GM is famed such that the ground metal layer GM penetrates a portion of a region of an entire region of the surface insulation layer SH which is formed entirely on the surface of the metal body MB and which has the two insulation films, and is directly in contact with and connected to the metal body MB.

Referring to FIG. 1, the ground metal layer GM is provided on a first side of the metal body MB (for example, an upper side of the metal body MB), and is in contact with the metal body MB while passing through the surface insulation layer SH. More specifically, the ground metal layer GM is in contact with and connected to a portion of a region of the entire region of the surface of the metal body MB by passing through the surface insulation layer SH. The guide plate of the first embodiment is provided with the surface insulation layer SH that surrounds the metal body MB with a remaining region except the region provided with the ground metal layer GM.

FIGS. 2A to 4B are views enlarging and illustrating a portion of various modification examples of the guide plate of the first embodiment. The modification examples described below differ in that a formation range of the anodic oxide insulation film AS or the deposition insulation film ES is different from a formation range of the anodic oxide insulation film AS or the deposition insulation film ES of the guide plate of the first embodiment, and the remaining components are the same. Therefore, hereinafter, characteristic components will be mainly described, and descriptions of the same or similar components will be omitted.

Figure 2A:
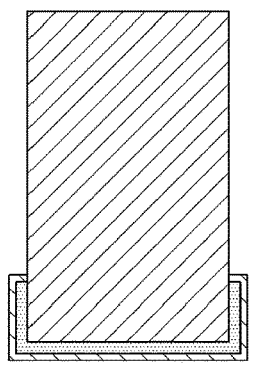
FIGS. 2A to 4B are views enlarging and illustrating a portion of modification examples of the guide plate according to an exemplary embodiment of the present disclosure.
Figure 2A:
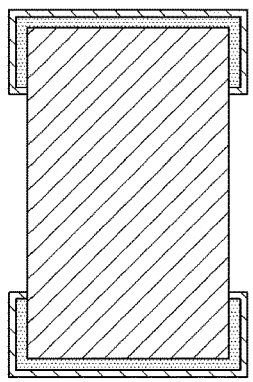
Figure 2A:
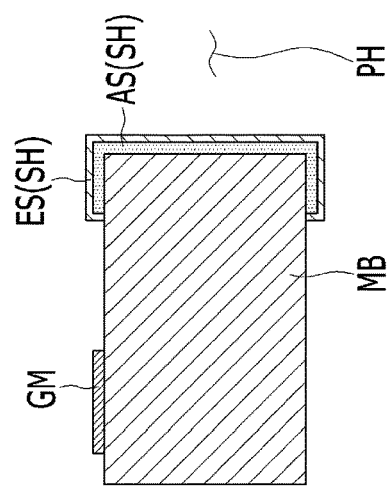

First, FIG. 2A is a view enlarging and illustrating a portion of a guide plate GP1-1 of a first-1 modification example.

Referring to FIG. 2A, the guide plate GP1-1 of the first-1 modification example is provided with the anodic oxide insulation film AS famed on the inner wall of the penetration hole PH of the metal body MB, the anodic oxide insulation film AS being formed on a portion of a region including a part which is positioned at an upper end side of the inner wall of the penetration hole PH in the entire region of the upper surface of the metal body MB and which is connected to an upper end of the inner wall of the penetration hole PH, and the anodic oxide insulation film AS being formed on a portion of a region including a part which is positioned at a lower end side of the inner wall of the penetration hole PH in the entire region of the lower surface of the metal body MB and which is connected to a lower end of the inner wall of the penetration hole PH.

That is, the guide plate GP1-1 of the first-1 modification example is provided with the anodic oxide insulation film AS partially formed on the inner wall of the penetration hole PH, on a portion of a region of the upper surface of the metal body MB including a part connected to the upper portion of the inner wall of the penetration hole PH, and on a portion of a region of the lower surface of the metal body MB including a part connected to the lower portion of the inner wall of the penetration hole PH.

Accordingly, the guide plate GP1-1 of the first-1 modification example is provided with the anodic oxide insulation film AS foiled on the inner wall of the penetration hole PH and on a portion of a region existing around the penetration hole PH in the entire region of the upper and lower surfaces of the metal body MB.

More specifically, the guide plate GP1-1 of the first-1 modification example is provided with the anodic oxide insulation film AS formed on the inner wall of the penetration hole PH and on a region which surrounds the penetration hole PH around the penetration hole PH in the surface of the metal body MB and which is a surface region (specifically, an upper surface region of the metal body MB corresponding to an upper engagement part HG1 and a lower surface region of the metal body MB corresponding to a lower engagement part HG2) of the metal body MB capable of being in contact with the upper engagement part HG1 and the lower engagement part HG2 of the electrically conductive contact pin EP.

The guide plate GP1-1 of the first-1 modification example is provided with the deposition insulation film ES that surrounds the anodic oxide insulation film AS corresponding to the region where the anodic oxide insulation film AS is formed. Therefore, the deposition insulation film ES is formed partially only on the inner wall of the penetration hole PH and only on the surface of the anodic oxide insulation film AS formed around an opening of the penetration hole PH.

Preferably, in the guide plate GP1-1 of the first-1 modification example, the electrically conductive contact pin EP having a shape that is capable of being in contact with the upper and lower surfaces of the guide plate GP1-1 when the electrically conductive contact pin EP is slidably moved inside the penetration hole PH is mounted.

Specifically, in a socket pin used for a test socket, the upper engagement part HG1 and the lower engagement part HG2 are provided so as to prevent the socket pin from separating when the socket pin is mounted in the guide plate GP1-1. Accordingly, in a state in which the socket pin is mounted in the guide plate GP1-1, when the socket pin is slidably moved inside the penetration hole PH, there is a possibility that the socket pin may be in contact with the inner wall of the penetration hole PH, and there is a possibility that the upper and lower engagement parts HG1 and HG2 may be in contact with the upper and lower surfaces of the guide plate GP1-1 positioned around the opening of the penetration hole PH.

The guide plate GP1-1 of the first-1 modification example is provided with the anodic oxide insulation film AS and the deposition insulation film ES that are foiled on a region of a first end portion of the upper and lower surfaces of the guide plate GP1-1 positioned at the inner wall of the penetration hole PH and positioned around the opening of the penetration hole PH.

Therefore, preferably, the guide plate GP1-1 of the first-1 modification example is provided in a test device having a test socket, and is provided as a member where a socket pin is mounted.

In the guide plate GP1-1 of the first-1 modification example, the anodic oxide insulation film AS and the deposition insulation film ES surrounding the anodic oxide insulation film AS are provided only on a portion of a region positioned at the inner wall of the penetration hole PH in the entire region of the guide plate GP1-1 and at a side of the penetration hole PH in the entire region of the upper and lower surfaces of the metal body MB. Furthermore, in the remaining regions except for the regions described above, the metal body MB is exposed.

The guide plate GP1-1 of the first-1 modification example is provided such that the ground metal layer GM is in contact with and connected to a portion of a region of the metal body MB that is exposed. As an example, the ground metal layer GM is mounted such that the ground metal layer GM is in contact with and connected to a portion of a region where the anodic oxide insulation film AS and the deposition insulation film ES are not provided in the entire region of the upper surface of the metal body MB.

In the guide plate GP1-1 of the first-1 modification example, the surface insulation layer SH including the anodic oxide insulation film AS and the deposition insulation film ES is provided only on the portion of the region capable of being in contact with the electrically conductive contact pin EP in the entire region of the guide plate GP1-1, the remaining region of the metal body MB is exposed to the outside.

Accordingly, in the guide plate GP1-1 of the first-1 modification example, the ground metal layer GM is directly connected to the surface (the upper surface) of the metal body MB from the first side of the metal body MB.

Figure 2B:
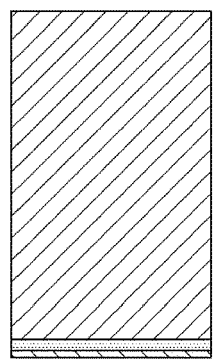
Figure 2B:
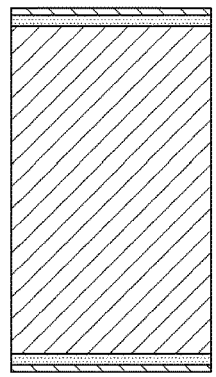
Figure 2B:
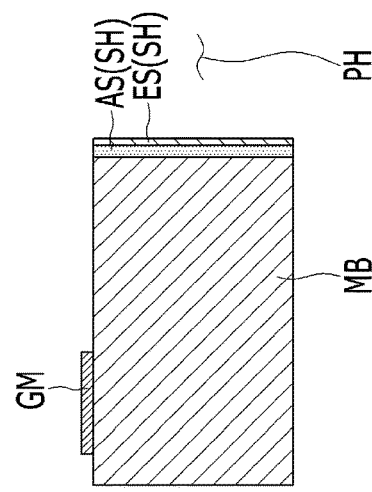

FIG. 2B is a view enlarging and illustrating a portion of a guide plate GP1-2 of a first-2 modification example.

Referring to FIG. 2B, in the guide plate GP1-2 of the first-2 modification example, the anodic oxide insulation film AS and the deposition insulation film ES are sequentially stacked on the inner wall of the penetration hole PH, and the remaining region (specifically, the upper and lower surfaces of the metal body MB) of the entire region of the metal body MB except the inner wall of the penetration hole PH is exposed to the outside.

That is, in the guide plate GP1-2 of the first-2 modification example, the surface insulation layer SH including two insulation films that are the anodic oxide insulation film AS and the deposition insulation film ES formed on the surface of the anodic oxide insulation film AS is famed only on the inner wall of the penetration hole PH. According to the guide plate GP1-2 of the first-2 modification example, in the entire region of the metal body MB, the surface insulation layer SH is not provided on the remaining region except the inner wall of the penetration hole PH, and the metal body MB is exposed.

In the guide plate GP1-2 of the first-2 modification example, the surface insulation layer SH is partially provided on the inner wall of the penetration hole PH only.

On the inner wall of the penetration hole PH, the guide plate GP1-2 of the first-2 modification example may be provided with at least one of the anodic oxide insulation film AS and the deposition insulation film ES.

Preferably, the guide plate GP1-2 of the first-2 modification example is provided with the anodic oxide insulation film AS that surrounds the inner wall of the penetration hole PH, and is provided with the deposition insulation film ES on the surface of the anodic oxide insulation film AS, so that the deposition insulation film ES is exposed inside the penetration hole PH. Therefore, when the electrically conductive contact pin EP is mounted, the deposition insulation film ES and the electrically conductive contact pin EP may be in contact with each other.

In the guide plate GP1-2 of the first-2 modification example, the electrically conductive contact pin EP that is in contact with the inner wall of the penetration hole PH is mounted.

Specifically, in a probe pin used in a probe card, the probe pin is mounted such that an outer side surface of the probe pin is in contact with the inner wall of the penetration hole PH of the guide plate GP1-2.

The guide plate GP1-2 of the first-2 modification example is provided such that the anodic oxide insulation film AS and the deposition insulation film ES are sequentially stacked on the inner wall of the penetration hole PH, thereby insulating the electrically conductive contact pin EP inserted into and mounted on the inner wall of the penetration hole PH and the metal body MB and having abrasion resistance against friction caused by the sliding movement of the electrically conductive conduct pin EP.

Therefore, preferably, the guide plate GP1-2 of the first-2 modification example is provided in a test device having a probe card, and is provided as a member where a probe pin is mounted.

The guide plate GP1-2 of the first-2 modification example is provided such that the ground metal layer GM is provided on an exposed region of the metal body MB in the entire region of the metal body MB. Referring to FIG. 2B, as an example, the guide plate GP1-2 of the first-2 modification example is provided such that the ground metal layer GM is provided on a portion of a region of the metal body MB in the entire region of the upper surface of the metal body MB. The ground metal layer GM is directly connected to the upper surface of the metal body MB.

Figure 3A:
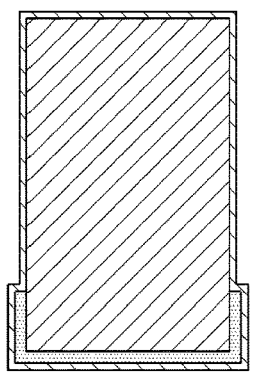
Figure 3A:
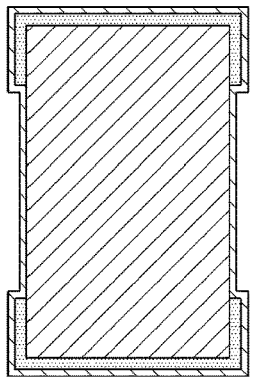
Figure 3A:
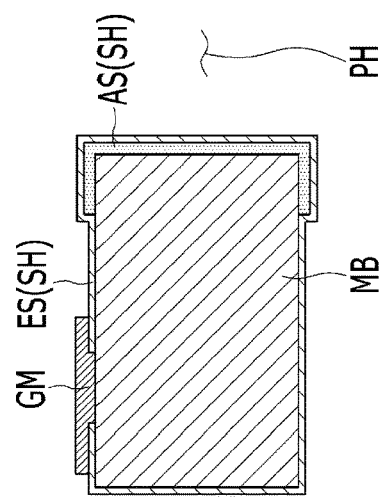

FIG. 3A is a view enlarging and illustrating a portion of a guide plate GP1-3 of a first-3 modification example.

Referring to FIG. 3A, in the guide plate GP1-3 of the first-3 modification example, the anodic oxide insulation film AS is provided partially only on the inner wall of the penetration hole PH, on a portion of a region positioned at a side of the penetration hole PH in the entire region of the upper surface of the metal body MB, and on a portion of a region positioned at a side of the penetration hole PH in the entire region of the lower surface of the metal body MB.

In the guide plate GP1-3 of the first-3 modification example, the anodic oxide insulation film AS is provided on a portion of a region (specifically, the inner wall of the penetration hole PH and a region which surrounds the penetration hole PH around the penetration hole PH in the surface of the metal body MB and which is a surface region capable of being in contact with the upper and lower engagement parts HG1 and HG2 of the electrically conductive contact pin EP) in the entire region of the surface of the metal body MB, and the deposition insulation film ES is provided such that the deposition insulation film ES entirely surrounds the surface of the metal body MB.

Specifically, the deposition insulation film ES is formed on the surface of the metal body MB such that the deposition insulation film ES entirely surrounds the metal body MB. At this time, the anodic oxide insulation film AS is provided on the inner wall of the penetration hole PH of the metal body MB, on a region of a first end portion positioned on a side of the penetration hole PH in the entire region of the upper surface of the metal body MB, and on a region of the first end portion positioned on the side of the penetration hole PH in the entire region of the lower surface of the metal body MB.

Therefore, the deposition insulation film ES is continuously formed by entirely surrounding the surface of the metal body MB, and is formed such that the deposition insulation film ES surrounds the inner wall of the penetration hole PH and surrounds the surface of the anodic oxide insulation film AS at the region of the first end portion positioned at the side of the penetration hole PH in the entire region of the upper and lower surfaces of the metal body MB.

In the guide plate GP1-3 of the first-3 modification example, the anodic oxide insulation film AS is partially provided at a position where the electrically conductive contact pin EP is capable of being in contact with the guide plate GP1-3, and the deposition insulation film ES is provided such that the deposition insulation film ES surrounds the surface of the anodic oxide insulation film AS and entirely surrounds the metal body MB.

Accordingly, the guide plate GP1-3 of the first-3 modification example is provided with the surface insulation layer SH including two insulation films that are the anodic oxide insulation film AS and the deposition insulation film ES, the anodic oxide insulation film AS being provided on the inner wall of the penetration hole PH and a portion (specifically, the region of the first side end portion in the entire region of the upper and lower surfaces of the metal body MB) around the opening of the penetration hole PH, the deposition insulation film ES surrounding the anodic oxide insulation film AS from the surface of the anodic oxide insulation film AS.

The deposition insulation film ES is formed along the surface of the metal body MB on which the deposition insulation film ES is formed. According to the guide plate GP1-3 of the first-3 modification example, in a state in which the anodic oxide insulation film AS is partially formed on the inner wall of the penetration hole PH and on the portion around the opening of the penetration hole PH, the deposition insulation film ES is formed. According to the guide plate GP1-3 of the first-3 modification example, in the entire region of the surface of the guide plate GP1-3, the surface insulation layer SH is formed such that a thickness of the surface insulation layer SH formed on the inner wall of the penetration hole PH and formed around the opening of the penetration hole PH is larger than a thickness of the surface insulation layer SH formed on the remaining region. In the guide plate GP1-3 of the first-3 modification example, since the surface insulation layer SH is formed such that the thickness of the surface insulation layer SH at a part capable of being in contact with the electrically conductive contact pin EP is larger than the thickness of the remaining part, abrasion resistance and durability of the penetration hole PH and around the penetration hole PH may be further improved.

In the guide plate GP1-3 of the first-3 modification example, the surface insulation layer SH including the two insulation films is provided at the part having high possibility of being in contact with the electrically conductive contact pin EP, and the deposition insulation film ES is provided at the remaining part, so that an electrical short problem between the metal body MB and the electrically conductive contact pin EP is capable of being prevented and high abrasion resistance and high durability against friction between the electrically conductive contact pin EP are provided.

In the guide plate GP1-3 of the first-3 modification example, the ground metal layer GM is provided such that the ground metal layer GM is in contact with and connected to the metal body MB by passing through the deposition insulation film ES.

The ground metal layer GM is connected to a region of a second end portion of the metal body MB that is positioned relatively far from around the opening of the penetration hole PH in the entire region of the upper surface of the metal body MB. The ground metal layer GM is connected to the metal body MB by passing through a region of a portion of the deposition insulation film ES corresponding to the region of the second end portion of the metal body MB while entirely surrounding the metal body MB.

The guide plate GP1-3 of the first-3 modification example is provided with the anodic oxide insulation film AS formed on the inner wall of the penetration hole PH and formed around the opening of the penetration hole PH, and has a structure in which the surface of the metal body MB is entirely surrounded by the deposition insulation film ES. Preferably, the guide plate GP1-3 is provided in a test socket and a socket pin is mounted therein.

Figure 3B:
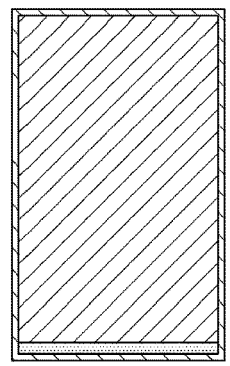
Figure 3B:
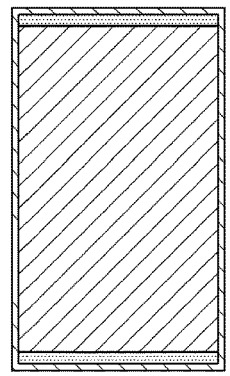
Figure 3B:
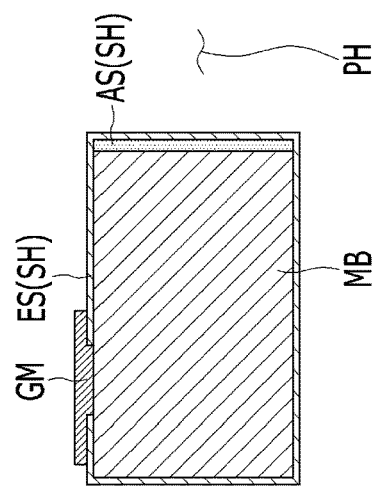

FIG. 3B is a view enlarging and illustrating a portion of a guide plate GP1-4 of a first-4 modification example.

Referring to FIG. 3B, in the guide plate GP1-4 of the first-4 modification example, the anodic oxide insulation film AS is provided on the inner wall of the penetration hole PH and the deposition insulation film ES entirely surrounding the metal boy MB is provided, so that the guide plate GP1-4 has a structure in which the anodic oxide insulation film AS provided on the inner wall of the penetration hole PH is not exposed and is covered with the deposition insulation film ES.

In the guide plate GP1-4 of the first-4 modification example, the inner wall of the penetration hole PH is protected by the surface insulation layer SH including two insulation films through the anodic oxide insulation film AS and the deposition insulation film ES.

In the guide plate GP1-4 of the first-4 modification example, the ground metal layer GM is provided on the region of the second end portion of the upper surface positioned relatively far from the penetration hole PH in the entire region of the upper surface of the metal body MB. The ground metal layer GM is in contact with and connected to the metal body MB from the region of the second end portion by passing through the deposition insulation film ES corresponding to the region of the second end portion of the upper surface of the metal body MB.

In the guide plate GP1-4 of the first-4 modification example, the anodic oxide insulation film AS is provided on the inner wall of the penetration hole PH, and the deposition insulation film ES continuously formed by entirely surrounding the metal body MB is provided, so that the two insulation films are provided on the inner wall of the penetration hole PH.

Therefore, preferably, the guide plate GP1-4 of the first-4 modification example is provided in a test device provided with a probe card and the probe pin is mounted in the guide plate GP1-4.

Figure 4A:
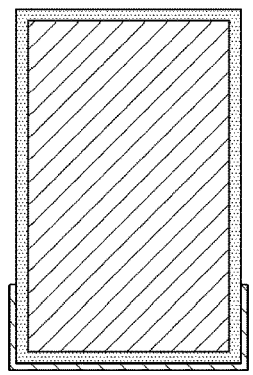
Figure 4A:
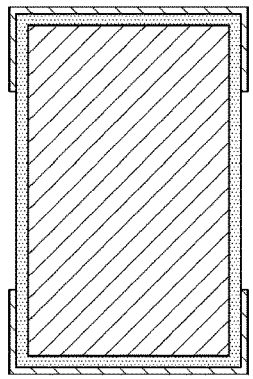
Figure 4A:
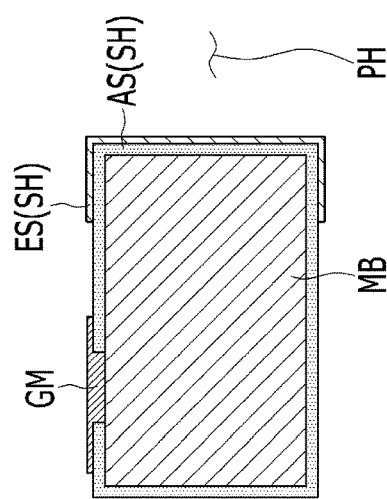

FIG. 4A is a view enlarging and illustrating a portion of a guide plate GP1-5 of a first-5 modification example.

Referring to FIG. 4A, in the guide plate of the first-5 modification example, the anodic oxide insulation film AS is provided on the surface of the metal body MB, and the deposition insulation film ES is partially provided on the inner wall of the penetration hole PH and on a portion of a region positioned at a side of the penetration hole PH in the entire region of the upper and lower surfaces of the metal body MB around the opening of the penetration hole PH.

In the guide plate GP1-5 of the first-5 modification example, the anodic oxide insulation film AS is entirely famed such that the anodic oxide insulation film AS surrounds the surface of the metal body MB, and then the deposition insulation film ES is partially provided on the inner wall of the penetration hole PH and on a portion around the opening of the penetration hole PH where the anodic oxide insulation film AS is formed such that the deposition insulation film ES covers the anodic oxide insulation film AS.

Therefore, the inner wall of the penetration hole PH and on the portion around the opening of the penetration hole PH are protected by the two insulation films.

In the guide plate GP1-5 of the first-5 modification example, the ground metal layer GM is connected to the region of the second end portion positioned relatively far from the penetration hole PH in the entire region of the upper surface of the metal body MB. The ground metal layer GM is in contact with and connected to the metal body MB by passing through the anodic oxide insulation film AS at a position corresponding to the region of the second end portion of the anodic oxide insulation film AS formed on the surface of the metal bod MB.

In the guide plate GP1-5 of the first-5 modification example, the surface insulation layer SH including two insulation films is partially provided on the inner wall of the penetration hole PH and around the opening of the penetration hole PH, and the anodic oxide insulation film AS is provided such that the anodic oxide insulation film AS entirely surrounds the metal body MB.

Therefore, preferably, the guide plate GP1-5 of the first-5 modification example is provided in a test device provided with a test socket and a socket pin is mounted in the guide plate GP1-5.

Figure 4B:
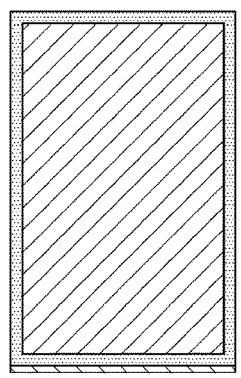
Figure 4B:
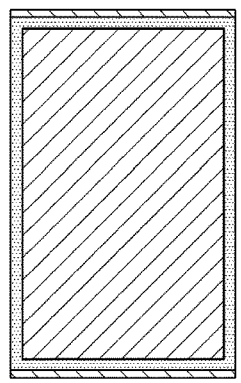
Figure 4B:
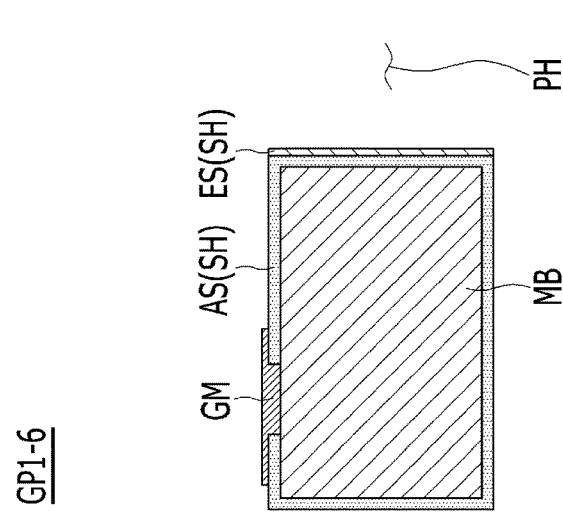

FIG. 4B is a view enlarging and illustrating a portion of a guide plate GP1-6 of a first-6 modification example.

Referring to FIG. 4B, in the guide plate GP1-6 of the first-6 modification example, the anodic oxide insulation film AS is provided such that the anodic oxide insulation film AS entirely surrounds the metal body MB, and the deposition insulation film ES is partially provided on the surface of the anodic oxide insulation film AS surrounding the inner wall of the penetration hole PH.

The guide plate GP1-6 of the first-6 modification example is provided with the surface insulation layer SH having the two insulation films including the anodic oxide insulation film AS and the deposition insulation film ES corresponding to the inner wall of the penetration hole PH. The anodic oxide insulation film AS entirely surrounding the metal body MB is provided around the opening of the penetration hole PH.

In the guide plate GP1-6 of the first-6 modification example, the ground metal layer GM is connected to the region of the second end portion positioned relatively far from the penetration hole PH in the entire region of the upper surface of the metal body MB. The ground metal layer GM is connected to the metal body MB by passing through the anodic oxide insulation film AS positioned at a position corresponding to the region of the second end portion.

In the guide plate GP1-6 of the first-6 modification example, the surface insulation layer SH including the two insulation films is provided on the inner wall of the penetration hole PH. Preferably, the guide plate GP1-6 is provided in a test device having a probe card, and a probe pin is mounted in the guide plate GP1-6.

Figure 5:
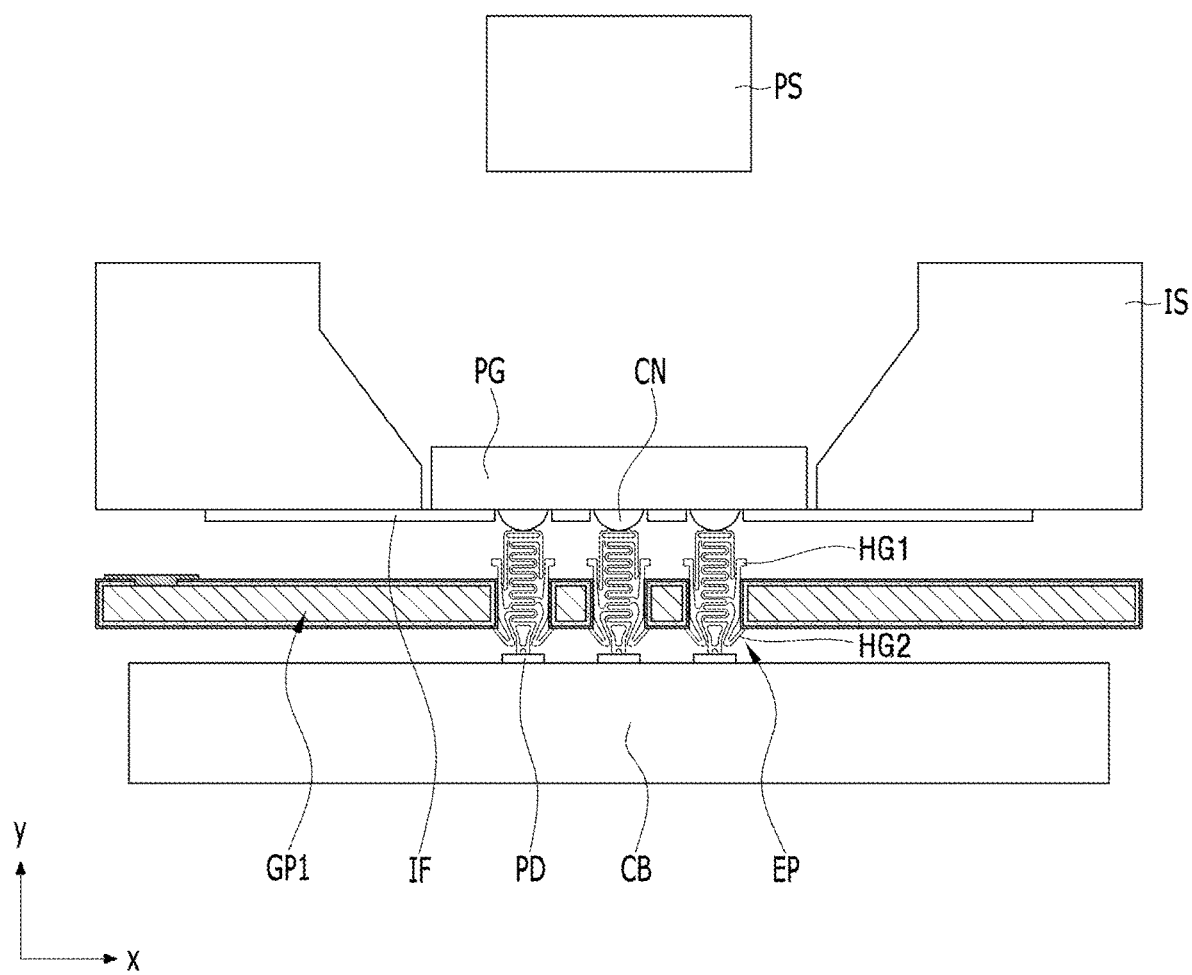
FIG. 5 is a view illustrating an embodiment in which the guide plate according to an exemplary embodiment of the present disclosure is provided in a test socket.

FIG. 5 is a view schematically illustrating a test socket TS that is an example of a test device TD.

The test socket TS includes the guide plate of the first embodiment described with reference to FIG. 1, and includes the guide plates GP1-1, GP1-2, GP1-3, GP1-4, GP1-5, and GP1-6 of the first-1 modification example to the first-6 modification example described with reference to FIGS. 2A to 4B. More preferably, the test socket TS includes at least one of the guide plate of the first embodiment, the guide plate GP1-1 of the first-1 modification example, the guide plate GP1-3 of the first-3 modification example, and the guide plate GP1-5 of the first-modification example.

In FIG. 5, as an example, the test socket TS is illustrated such that the test socket TS is provided with the guide plate of the first embodiment.

The test socket TS includes the guide plate in which the electrically conductive contact pin EP is mounted, an insert IS in which a semiconductor package PG is accommodated, and a pusher PS configured to press the semiconductor package PG.

The plurality of electrically conductive contact pins EP is mounted in the guide plate. Preferably, the electrically conductive contact pin EP is provided as a socket pin.

The insert IS accommodates the semiconductor package PG so that a test is capable of being performed in a state in which the semiconductor package PG is stabilized. An insert film IF provided with a hole to guide a connection terminal CN of the semiconductor package PG is mounted on a lower portion of the insert IS. The insert film IF is provided between the semiconductor package PG and the electrically conductive contact pin EP. When a test of the semiconductor package PG is performed, the connection terminal CN of the semiconductor package PG is inserted into the hole provided in the insert film IF, so that an accurate contact position is guided.

The pusher PS serves to press the semiconductor package PG to a predetermined pressure, the semiconductor package PG being accommodated in an accommodating part of the insert IS. The semiconductor package PG is pressed by the pusher PS and is electrically connected to a pad PD of a circuit board CB through the electrically conductive contact pin EP mounted in the guide plate.

The guide plate of the first embodiment is provided with the surface insulation layer SH on the surface of the metal body MB. The surface insulation layer SH includes two insulation films that are the anodic oxide insulation film AS entirely surrounding the surface of the metal body MB and the deposition insulation film ES formed on the surface of the anodic oxide insulation film AS.

In the test socket TS, in a state in which the electrically conductive contact pin EP is mounted in the guide plate G1 of the first embodiment, a process of electrically connecting the semiconductor package PG to the pad PD of the circuit board CB through the electrically conductive contact pin EP by pressing the semiconductor package PG with the pusher PS is performed.

At this time, the guide plate of the first embodiment is provided with the metal body MB, so that the signal interference or noise between the electrically conductive contact pins EP is prevented and also the electrical short with the electrically conductive contact pin EP is prevented through the surface insulation layer (specifically, the anodic oxide insulation film AS and the deposition insulation film ES) surrounding the metal body MB. In addition, since the surface insulation layer SH is provided, the guide plate of the first embodiment has high abrasion resistance and high durability against friction caused by the sliding movement of the electrically conductive contact pin EP.

Since the test socket TS is provided with the guide plate of the first embodiment, the high frequency characteristics test of the semiconductor package PG may be performed more effectively without signal interference or noise problems.

Figure 6:
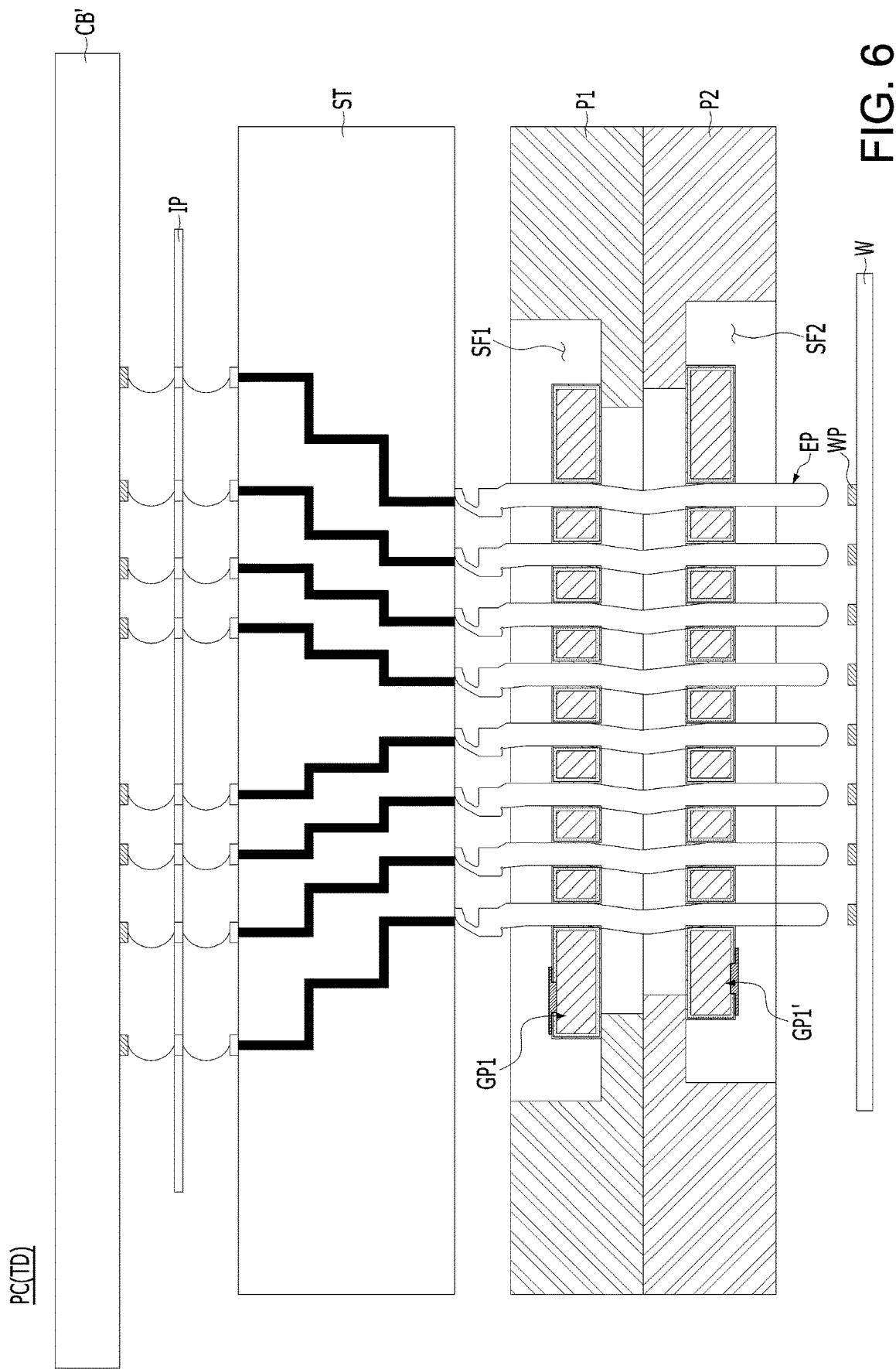
FIG. 6 is a view illustrating an embodiment in which the guide plate according to an exemplary embodiment of the present disclosure is provided in a probe card.

FIG. 6 is a view schematically illustrating a probe card (specifically, a vertical type probe card) that is an example of the test device TD.

A probe card PC includes at least one of the guide plate of the first embodiment and the guide plates GP1-1, GP1-2, GP1-3, GP1-4, GP1-5, and GP1-6 of the first-1 modification example to the first-6 modification example. More preferably, the probe card PC includes at least one of the guide plate of the first embodiment, the guide plate GP1-2 of the first-2 modification example, the guide plate GP1-4 of the first-4 modification example, and the guide plate GP1-6 of the first-6 modification example.

In FIG. 6, the probe card PC is illustrated such that the probe card PC is provided with the guide plate of the first embodiment described with reference to FIG. 1.

The probe card PC includes a probe head PH including a circuit board CB', an interposer IP, a space transformer ST, and the guide plate, and includes the electrically conductive contact pin EP (specifically, a probe pin).

The probe card PC has an electrical path provided through the order of the circuit board CB', the interposer IP, the space transformer ST, and the probe head PH, and is configured to test a pattern of a wafer W by the electrically conductive contact pin EP that is in direct contact with the wafer W. The electrically conductive contact pin EP is in contact with an electrode pad WP of the wafer W, and performs a pattern test of the wafer W.

The probe head PH supports the electrically conductive contact pin EP, and serves to prevent an electrical short circuit due to contact between adjacent probes. The probe head PH includes at least one guide plate, and supports the electrically conductive contact pin EP mounted in the penetration hole PH of the guide plate.

Referring to FIG. 6, the guide plate includes a first guide plate GP1 and a second guide plate GP1'. Therefore, the probe card PC is provided with two guide plates GP1 and GP1'.

The first guide plate GP1 is provided in a first seating region SF1 formed in a first plate P1.

The second guide plate G1' is seated in a second seating region SF2 of a second plate P2 that is coupled to the first plate P1 in an inverted form to the lower portion of the first plate P1.

The first and second plates P1 and P2 are coupled to each other in a state in which positions of the first and second plates P1 and P2 are not aligned with each other. Accordingly, the first and second guide plates GP1 and GP1' are provided in a state in which positions of the first and second guide plates GP1 and GP1' are not aligned with each other. Therefore, the electrically conductive contact pins EP inserted through the penetration holes PH of the first and second guide plates GP1 and GP1' are provided in a form in which middle portions positioned at a separation distance between the first and second guide plates GP1 and GP1' are elastically deformed.

The first guide plate GP1 and the second guide plate GP1' are provided with the same structure in which the metal body MB is included and the anodic oxide insulation film AS entirely surrounding the surface of the metal body MB and the deposition insulation film ES formed on the surface of the anodic oxide insulation film AS are included.

Accordingly, the first and second guide plates GP1 and GP1' are insulated from the electrically conductive contact pins EP inserted into the penetration holes PH, thereby preventing signal interference and noise between the electrically conductive contact pins EP. In addition, by the anodic oxide insulation film AS and the deposition insulation film ES formed on the inner wall of the penetration hole PH, the first and second guide plates GP1 and GP1' have abrasion resistance and durability against sliding friction between the electrically conductive contact pin EP and the inner wall of a penetration hole PH.

Therefore, since the probe card PC is provided with the guide plate of the first embodiment, the test of high frequency characteristics of the wafer W may be performed more effectively.

Figure 7:
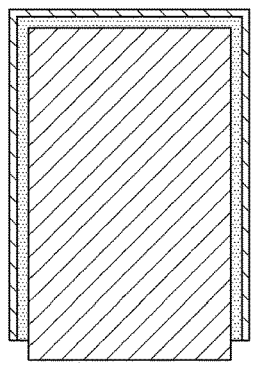
FIG. 7 is a view enlarging and illustrating a portion of a modification example of the guide plate in which a signal pin and a ground pin are mounted.
Figure 7:
Figure 7:
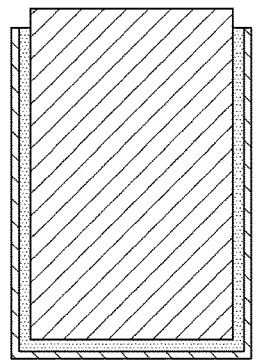
Figure 7:
Figure 7:
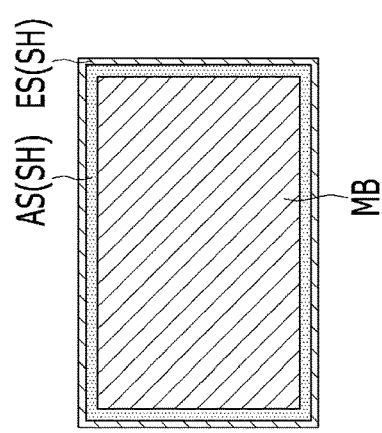

FIG. 7 is a view enlarging and illustrating a portion of a guide plate GP2 according to an exemplary second embodiment of the present disclosure.

In the guide plate GP2 of the second embodiment, the surface insulation layer SH is provided on the inner wall of the penetration hole PH into which the electrically conductive contact pin EP functioning as a signal pin among the plurality of electrically conductive contact pins EP mounted in the guide plate GP2 of the second embodiment, and the surface insulation layer SH is not provided on the inner wall of the penetration hole PH into which the electrically conductive contact pins EP functioning as a ground pin, so that the guide plate GP2 of the second embodiment is different from the guide plate of the first embodiment. Since the remaining configurations except the configuration described above is the same, hereinafter, characteristic configurations will be mainly described, and descriptions of the same or similar configurations will be omitted.

The guide plate GP2 of the second embodiment is provided with the anodic oxide insulation film AS such that the anodic oxide insulation film AS entirely surrounds the surface of the metal body MB, and is provided with the deposition insulation film ES on the surface of the anodic oxide insulation film AS.

The guide plate GP2 of the second embodiment is provided with an insulation film removal region by removing the anodic oxide insulation film AS and the deposition insulation film ES that are formed on the inner wall of the penetration hole PH and around the opening of the penetration hole PH into which the electrically conductive contact pin EP that functions as the ground pin among the plurality of penetration holes PH.

Referring to FIG. 7, the guide plate GP2 of the second embodiment does not have the anodic oxide insulation film AS and the deposition insulation film ES on the inner wall of one penetration hole PH among the two penetration holes PH and a portion (specifically, the region of the first end portion positioned at the side of the penetration hole PH in the entire region of the upper surface of the metal body MB and the region of the first end portion positioned at the side of the penetration hole PH in the entire region of the lower surface of the metal body MB) around the opening of the penetration hole PH. Accordingly, the metal body MB is provided in a state in which the metal body MB is exposed to the inner wall of the penetration hole PH and around the opening of the penetration hole PH. Through this, the guide plate GP2 in the second embodiment is provided with the insulation film removal region provided in a state in which the metal body MB is exposed to a portion of a region in the entire region. The insulation film removal region includes the inner wall of the penetration hole PH where the anodic oxide insulation film AS and the deposition insulation film ES are not formed, and includes a portion (specifically, the region of the first end portion positioned at the side of the penetration hole PH in the entire region of the upper surface of the metal body MB and the region of the first end portion positioned at the side of the penetration hole PH in the entire region of the lower surface of the metal body MB) around the opening of the penetration hole PH.

Preferably, in the guide plate GP2 of the second embodiment, the electrically conductive contact pin EP functioning as the ground pin is positioned on the insulation film removal region provided in a state in which the metal body MB is exposed.

The ground pin performs a grounding function. Therefore, the ground pin is capable of being in contact with and electrically connected to the inner wall of the penetration hole PH famed of the metal body MB while the ground pin is slidably moved inside the penetration hole PH. Therefore, the ground pin is inserted into the penetration hole PH which is included in the insulation film removal region and in which the metal body MB is exposed.

As an example, the penetration hole PH in which the anodic oxide insulation film AS and the deposition insulation film ES are not provided on the inner wall is referred to as a first penetration hole PH1.

In the first penetration hole PH1, the anodic oxide insulation film AS and the deposition insulation film ES are not provided on the inner wall of the first penetration hole PH1. At this time, the guide plate GP2 of the second embodiment does not have the anodic oxide insulation film AS and the deposition insulation film ES even around the opening of the first penetration hole PH1. In the guide plate GP2 of the second embodiment, the anodic oxide insulation film AS and the deposition insulation film ES surrounding a remaining region are provided on the remaining region except the inner wall of the first penetration hole PH1 and around the opening of the first penetration hole PH1 in the entire region of the metal body MB. The metal body MB is exposed to the inner wall of the first penetration hole PH1 and around the opening of the first penetration hole PH1. In the guide plate GP2 of the second embodiment, the electrically conductive contact pin EP that functions as the ground pin is inserted into the first penetration hole PH1.

Meanwhile, in the guide plate GP2 of the second embodiment, the anodic oxide insulation film AS and the deposition insulation film ES are provided entirely on the surface of the metal body MB including the inner wall of one penetration hole PH among the plurality of penetration holes PH and around the opening of the penetration hole PH. Preferably, in the guide plate GP2 of the second embodiment, the electrically conductive contact pin EP that functions as the signal pin is inserted into the penetration hole PH in which the anodic oxide insulation film AS and the deposition insulation film ES are formed on the inner wall of the penetration hole PH. Hereinafter, the penetration hole PH in which the anodic oxide insulation film AS and the deposition insulation film ES are formed on the inner wall of the penetration hole PH is referred to as a second penetration hole PH2.

Since the signal pin is configured to receive and transmit a signal, the signal pin is required to be insulated from the guide plate GP2 while the signal pin is inserted into the penetration hole PH.

Therefore, the signal pin is inserted into the penetration hole PH in which at least one of the anodic oxide insulation film AS and the deposition insulation film ES is formed on the inner wall of the penetration hole PH.

Referring to FIG. 7, the guide plate GP2 of the second embodiment is provided with the anodic oxide insulation film AS on the inner wall of the second penetration hole PH2, and is provided with the deposition insulation film ES surrounding the anodic oxide insulation film AS. At this time, the anodic oxide insulation film AS and the deposition insulation film ES are formed by continuously and entirely surrounding the surface of the metal body MB including the inner wall of the second penetration hole PH2 and around the opening of the second penetration hole PH2.

In the second penetration hole PH2, since the anodic oxide insulation film AS and the deposition insulation film ES are formed on the inner wall of the penetration hole PH capable of being in contact with the electrically conductive contact pin EP and around the opening of the penetration hole PH, the second penetration hole PH2 is not electrically connected to the electrically conductive contact pin EP even when the electrically conductive contact pin EP is in contact with the inside of the second penetration hole PH2. Therefore, preferably, the electrically conductive contact pin EP that functions as the signal pin is inserted into the second penetration hole PH2.

In the guide plate GP2 of the second embodiment, one of the plurality of penetration holes PH is not provided with the anodic oxide insulation film AS and the deposition insulation film ES on the inner wall of the penetration hole PH and around the opening of the penetration hole PH, and the remaining penetration hole PH is provided with the anodic oxide insulation film AS and the deposition insulation film ES on the entire region of the metal body MB including the inner wall of the penetration hole PH and around the opening of the penetration hole PH.

That is, in the guide plate GP2 of the second embodiment, one of the plurality of penetration holes PH is configured such that the metal body MB is exposed inside the penetration hole PH, and the remaining penetration hole PH is configured such that the metal body MB is provided with the surface insulation layer SH and the metal body MB is not exposed inside the penetration hole PH.

In the guide plate GP2 of the second embodiment, the electrically conductive contact pin EP functioning as the signal pin is inserted inside the penetration hole PH in which the metal body MB is not exposed, and the electrically conductive contact pin EP functioning as the ground pin is inserted inside the penetration hole PH in which the metal body MB is exposed.

Accordingly, the guide plate GP2 of the second embodiment maintains a state in which the signal pin and the penetration hole PH are insulated from each other in a position where the signal pin is inserted, and the ground pin is grounded by contacting the ground pin and the metal body MB in a position where the ground pin is inserted.

Through this, the guide plate GP2 of the second embodiment does not have to be provided with a separate ground metal layer GM.

The guide plate GP2 of the second embodiment in FIG. 7 has a structure in which the anodic oxide insulation film AS and the deposition insulation film ES are not provided on the inner wall of the first penetration hole PH1 and around the opening of the first penetration hole PH1. In this case, the guide plate GP2 of the second embodiment is provided in the test device TD having the test socket TS. Preferably, the electrically conductive contact pin EP provided as the socket pin is mounted in the guide plate GP2.

In contrast, the guide plate GP2 in the second embodiment may be configured such that the anodic oxide insulation film AS and the deposition insulation film ES are not provided on the inner wall of the first penetration hole PH1. In this case, the guide plate GP2 of the second embodiment is provided in the test device TD having the probe card PC, and the electrically conductive contact pin EP provided as the probe pin is mounted in the guide plate GP2.

Although the present disclosure has been described with reference to preferred embodiments, the preferred embodiments are presented to describe the technical spirit of the present disclosure only for illustrative purposes and those skilled in the art will appreciate that various modifications and changes are possible, without departing from the scope and spirit of the present disclosure.

What is claimed is:

1. A guide plate comprising:
    a metal body comprising a penetration hole passing through the metal body in up and down directions;
    a surface insulation layer formed on a surface of the metal body; and
    a ground metal layer connected to the metal body by passing through the surface insulation layer.

2. The guide plate of claim 1, wherein the surface insulation layer comprises an anodic oxide insulation film formed by anodizing the metal body.

3. The guide plate of claim 1, wherein the surface insulation layer comprises a deposition insulation film formed by atomic layer deposition.

4. The guide plate of claim 1, wherein the surface insulation layer comprises:
    an anodic oxide insulation film formed by anodizing the metal body; and
    a deposition insulation film formed on a surface of the anodic oxide insulation film by atomic layer deposition.

5. A test device comprising:
    a guide plate comprising a metal body that comprises a penetration hole, a surface insulation layer formed on a surface of the metal body and a ground metal layer connected to the metal body by passing through the surface insulation layer; and
    an electrically conductive contact pin inserted into the penetration hole.

* * * * *